Figure 10:
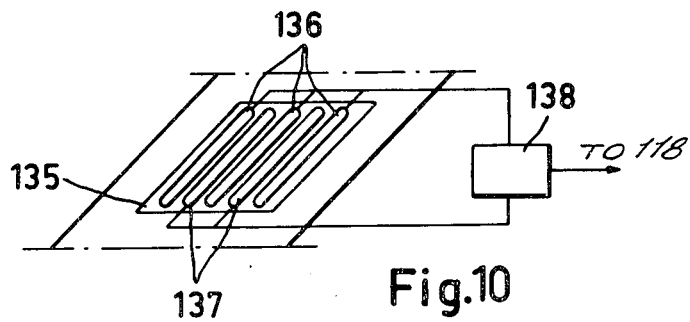

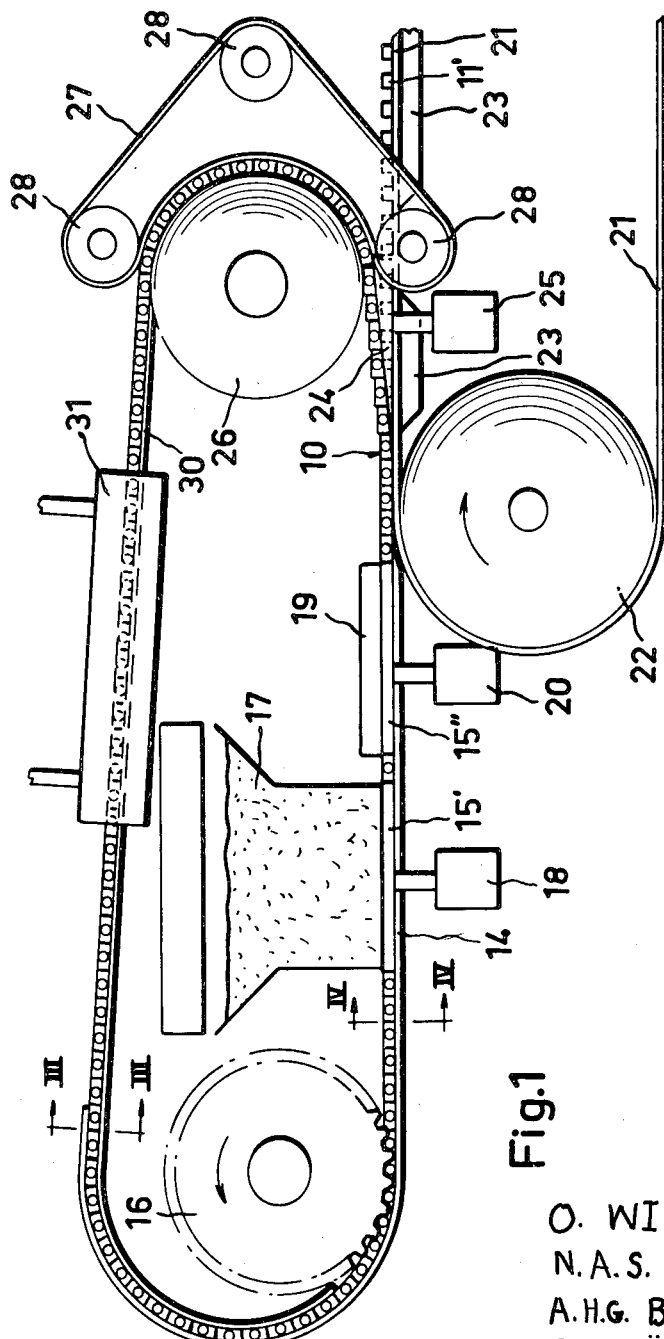

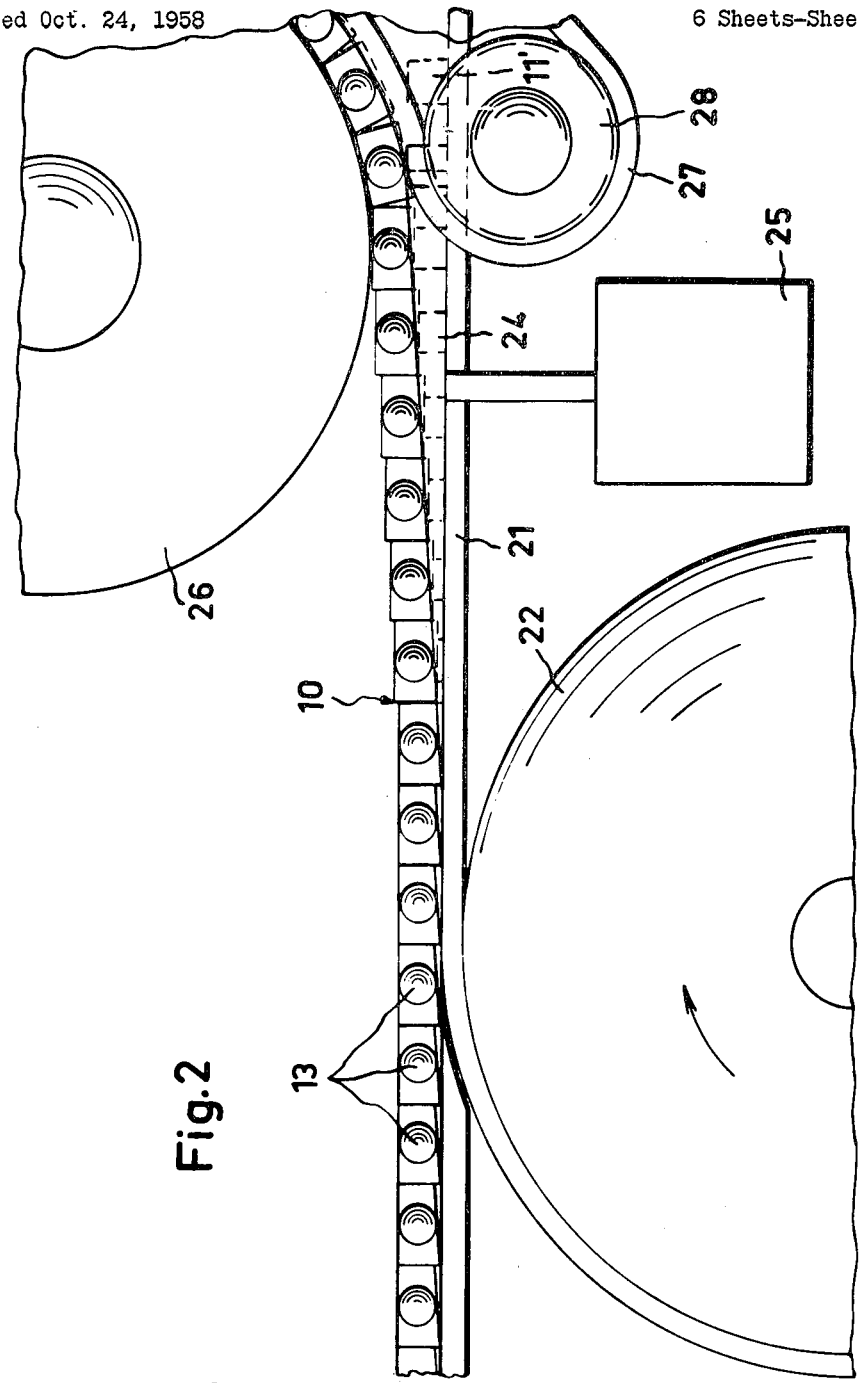

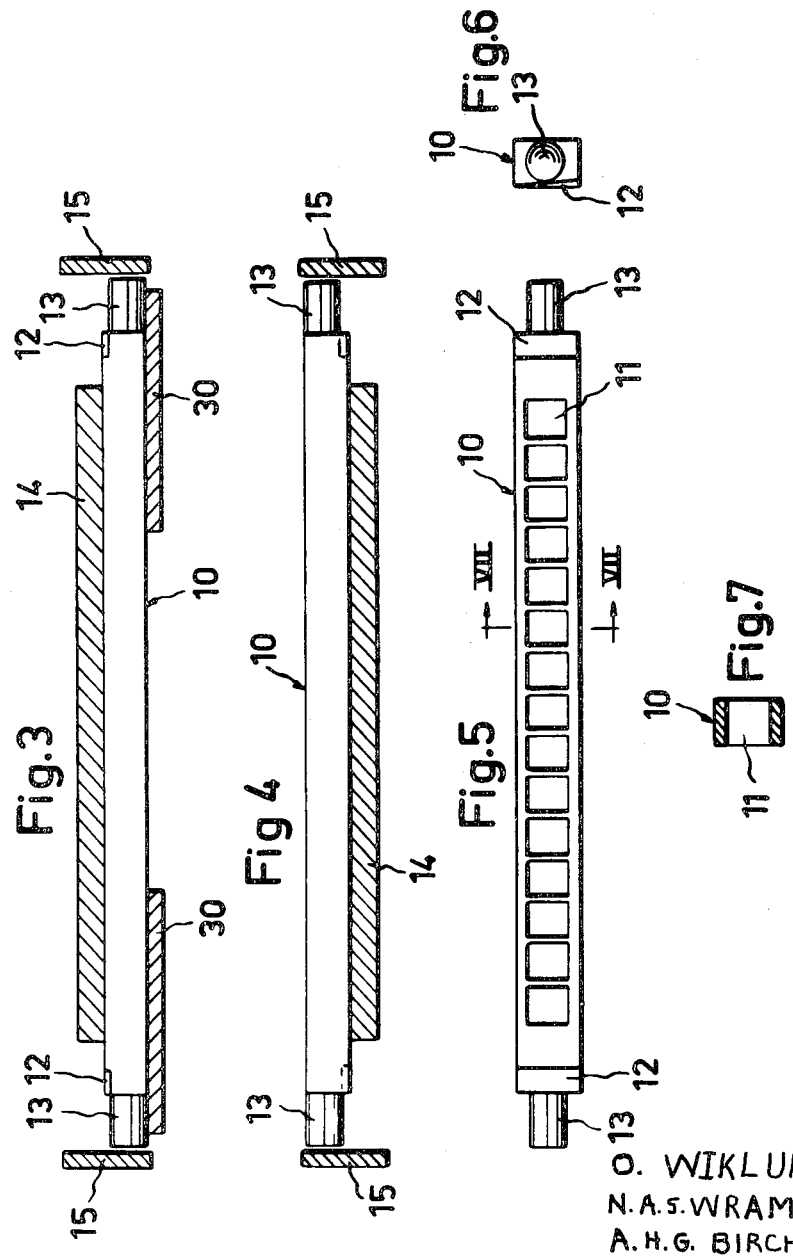

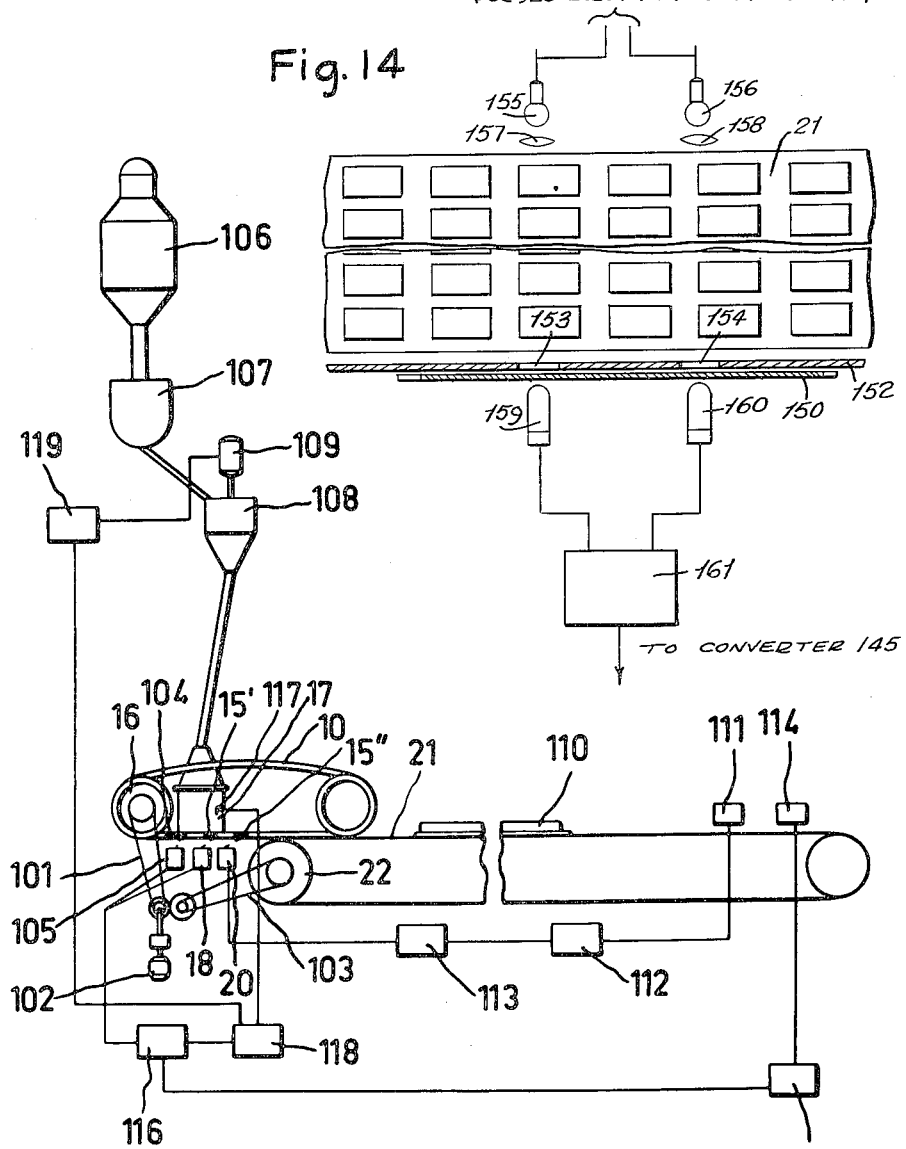

Oct. 24, 1961   O. WIKLUND ET AL   3,005,420
APPARATUS FOR MOULDING SUGAR CUBES
Filed Oct. 24, 1958   6 Sheets-Sheet 5

O. WIKLUND
N.A.S. WRAMSTEDT
A.H.G. BIRCH-IENSEN
G. BJÖRK
  INVENTORS

By:
Wenderoth, Lind & Ponack
  Attys

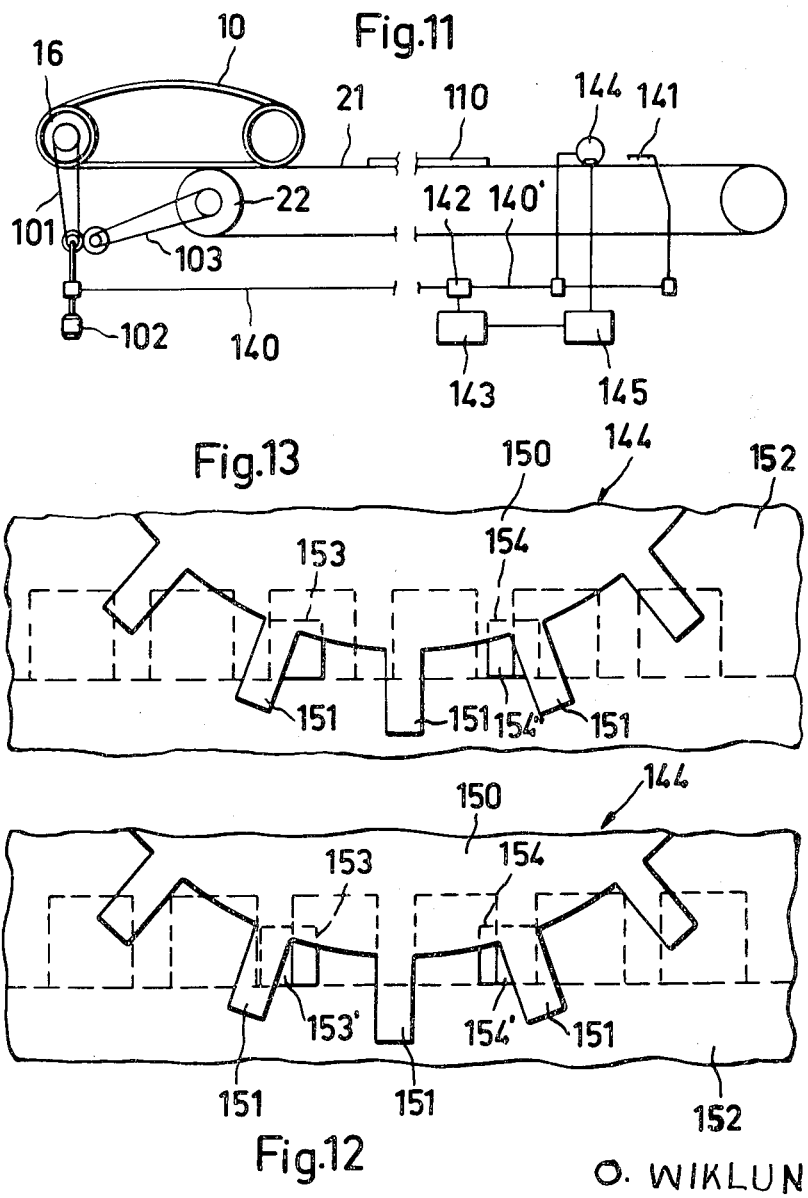

United States Patent Office 3,005,420
Patented Oct. 24, 1961

3,005,420
APPARATUS FOR MOULDING SUGAR CUBES
Olof Wiklund and Nils August Svante Wramstedt, Malmo, Ake Hans Gustaf Birch-Iensen, Arlov, and Gerhard Björk, Malmo, Sweden, assignors to Svenska Sockerfabriks Aktiebolaget, Malmo, Sweden, a corporation of Sweden
Filed Oct. 24, 1958, Ser. No. 769,500
Claims priority, application Sweden Nov. 1, 1957
22 Claims. (Cl. 107—8)

This invention relates to an apparatus for making moulded cubes from a moist composition of sugar crystals in moulds having removal openings for the finished moulded cubes.

It has been suggested to use vibration as an expedient of tightly packing a moist composition of sugar crystals into moulds for making lump sugar or other moulded cubes of hard sugar. The method of vibration is advantageous inasmuch as it is possible thereby to produce a porous lump sugar which is consequently readily soluble in liquids, but in spite of this it has not won any appreciable application in practice for such a manufacture. This seems to be due to the lack of a suitable apparatus that permits manufacture of lump sugar on a large industrial scale by the method of vibration and that solves the problems met with in such manufacture. Of these problems there may be mentioned that of removing the finished cube from the mould as perhaps the most difficult one to solve. The removal from the mould of a cube moulded and dried therein, without damaging it, is difficult, and what is more the drying of the moulded cube while it is still in the mould is more time-consuming, impractical and less economical than drying the cube after it has been removed from the mould. To manufacture lump sugar on a large industrial scale, it is therefore necessary to separate the moulded cubes from the moulds while said cubes are still in moist condition. However, in such condition the cubes are extremely brittle and the risk that they will fall to pieces when removed from the mould thus is very great.

The apparatus suggested according to the present invention has solved the problem of removing from a mould having a removal opening a moist cube cube of sugar crystals which has been moulded in said mould e.g. with the use of the vibration method and which is very brittle in moist condition. The apparatus of the invention is characterized by maintaining the mould with its removal opening facing downwardly and vibrating it during the removal of the moist cube moulded in said mould, and supporting the moulded cube, while causing it by the vibration to slide out of the mould, by supporting means in the form of a base serving to convey the moulded cube away from the mould.

Figure 9:
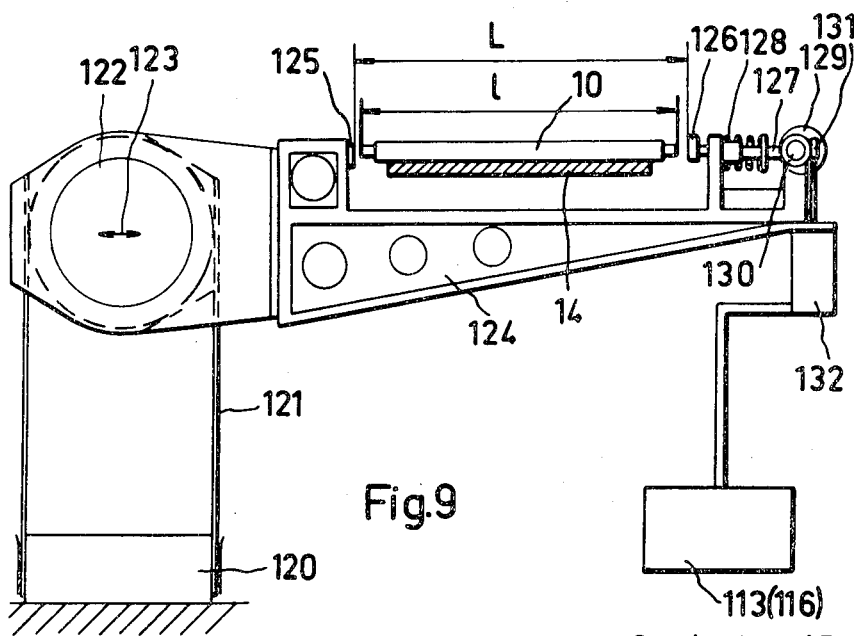

These and further features characteristic for the invention will become apparent from the following description, reference being had to the accompanying drawings, in which:

FIG. 1 is a diagrammatic side elevational view of a test apparatus embodying the invention and used for developing the invention, FIG. 2 is a side elevational view, on a larger scale, of the means for raising each of a number of successively arranged moulds from the base, FIG. 3 is a cross sectional view on line III—III in FIG. 1 on the same scale as in FIG. 2, FIG. 4 is a cross sectional view corresponding to FIG. 3, but taken on line IV—IV in FIG. 1, FIG. 5 is a plan view of an individual mould as seen from below, FIG. 6 is an end view of the mould in FIG. 5, FIG. 7 is a cross sectional view of the mould on line VII—VII in FIG. 5, FIG. 8 is a diagrammatic side elevational view of a moulding apparatus according to the invention including a system for regulating the filling capacity of the moulds and the packing of the moist composition of sugar crystals filled into the moulds as well as the moisture content of said moist composition supplied, the means for making the composition of sugar crystals being also illustrated diagrammatically, FIG. 9 is a cross sectional view, on a larger scale, of the moulding apparatus in FIG. 8, showing a mechanism for varying the intensity of the vibration to which the moulds are subjected.

FIG. 10 is a perspective view of an electrode system for measuring the moisture content of the moist composition of sugar crystals, FIG. 11 is a diagrammatic side elevational view of a moulding apparatus according to the invention having means for assembling several rows of moulded cubes in the direction of movement of said cubes to form a layer fitting a packing carton and including a system for phase correct synchronisation of the operation of said apparatus with the movement of the moulded cubes, FIGS. 12 and 13 are detailed views of a synchronism detector at phase coincidence and phase displacement, respectively, and FIG. 14 is a plan view of FIG. 13.

The apparatus illustrated in FIGS. 1-7 will first be described. It is adapted for continuous operation and includes a plurality of successively arranged moulds 10 which are moved in a closed circuitous path which is arranged as an endless path having upper and lower substantially rectilinear runs as well as arcuate runs connecting said first mentioned runs, the successively arranged moulds 10 being moved in said endless path like an endless chain in which the moulds form the individual links without being, however, connected to each other. Each mould consists of a rod of uniform thickness (FIGS. 5-7) of rectangular cross-sectional shape. The rod is formed with a plurality of mould recesses 11 distributed in the longitudinal direction of the rod and consisting of parallelepipedical through holes which extend between two opposite longitudinal side surfaces of the rod. Said rods may be made from metal and coated at least on the surfaces of limitation of the holes, with a hydrophobic material having a smooth surface, or in their entirety be made from such material, whereby the separation from the mould of a moulded moist cube is highly facilitated. A material that has proved suitable for this purpose is polytetrafluorethylene, which is available under the trade name of "Teflon." At each of its ends the rod 10 is formed, on one of said opposed longitudinal side surfaces, with a path of surface portions 12 so inclined at a small angle relative to the remainder of that surface that the thickness of the rod successively decreases between the other two opposite longitudinal side surfaces of the mould at these surface portions 12, as is best seen from FIG. 6. Finally, the rod at each of its ends has a cylindrical pin 13 projecting at right angles from the end surface.

The moulds thus arranged are placed substantially horizontally in the lower run of the circuitous path and extend transversely of the intended direction of movement in said circuitous path with the surface portions 12 situated at the lower side of the moulds and so oriented that the moulds successively rise as seen in the intended direction of movement. At the left-hand end of the lower run of the circuitous path, as seen in FIG. 1, the moulds 10 rest on supporting means (see also FIG. 4) in the form of a stationary base plate 14 and are prevented from being laterally displaced by means of stationary guide bars 15

(shown only in FIGS. 3 and 4) extending in the entire length of the circuitous path except for some short distances where they are replaced by vibrating guide bars, as will be described later on. At said end of the lower run the pins 13 at each end of the mould engage a pair of toothed wheels 16 connected to a suitable drive and having essentially the character of sprocket wheels, said toothed wheels being driven counter-clockwise as seen in FIG. 1 by a suitable motor. When the toothed wheels 16 rotate the moulds are thus urged to the right in the lower run of the circuitous path as seen in FIG. 1 and are thereby moved counter-clockwise through the entire circuitous path at the same time as they are held positively connected together. In said lower run they are first supported by the base plate 14 against which they slide with their level underside and which closes the lower open ends of the mould recesses 11, thus forming the bottom of said mould recesses. At their upper ends the mould recesses may be covered with a suitable protective plate (not shown) in order that no undesired objects may fall into said recesses on the way to the first station in the lower run of the circuitous path, said station being formed by means for filling the moulds with a moist composition of sugar crystals.

Said filling means is here shown as a simple hopper 17 which is held filled with a moist composition of sugar crystals in one way or the other. The mouth of said hopper extends transversely of the path of movement over such a distance that it covers all openings of a mould but does not project beyond it, said mouth extending in the direction of movement of the moulds over a plurality of such moulds in the lower run. The hopper 17 snugly fits the level upper sides of the moulds 10. At the travel of the moulds past the hopper 17 beneath the mouth thereof the moist composition of sugar crystals is filled into the mould recesses 11. Agitators (not shown) may be arranged in the hopper 17 to facilitate sliding of said moist composition into the mould recesses. At their travel past the hopper the moulds are also vibrated horizontally transversely of the path of movement in that the guide bars, formed as separate sections 15′, at the sides of the moulds in this area of the lower run are connected to a vibrator 18 which causes the rigidly interconnected guide bars 15′ to vibrate transversely of the plane of the drawing as seen in FIG. 1. Clearances are arranged between the moulds and the vibrating guide bars 15′ so that the moulds do not positively partake in the swinging movement of the guide bars 15′, but are constantly exposed to shocks by said bars to make the moulds bounce between them. By this arrangement the moist composition of sugar crystals is more efficiently packed in the mould recesses than would have been the case if the moulds took part positively in the movement of the guide bars 15′.

The moulds 10 which have been filled with the moist composition of sugar crystals are moved in under a stationary horizontal plate 19 which by its proper weight, possibly additionally loaded by weights or spring means, bears against the upper sides of the moulds, thereby forming a kind of cover which closes the mould recesses 11 at the top. Along the plate 19 the guide bars likewise are formed by a pair of separate sections 15″ connected to a vibrator 20, said sections being arranged and adapted to operate in the same manner as the vibrator 18 and the guide bars 15′. Like these latter bars, the guide bars 15″ are rigidly interconnected. At the travel of the moulds beneath said plate 19 the sugar crystals are further packed in the mould recesses so that the desired compactness is obtained.

At their further travel through said circuitous path the moulds come out from beneath the plate 19 at the right-hand end thereof as seen in FIG. 1 and they are now open again at their upper sides. They contain moulded moist sugar cubes prepared by vibrating said moulds. Said sugar cubes are extremely brittle and hardly withstand a touch without falling to pieces. They shall now be separated from the moulds. As a first step in this operation the moulds with the moulded cubes therein are transferred from the stationary base plate 14, along which they have been moved up to now, to an endless conveyor belt 21, preferably of steel, which the plate 14 snugly adjoins so that a soft transfer from the plate to the conveyor belt is obtained. The conveyor belt 21 travels over and is driven by a return pulley 22 which rotates clockwise, and is supported by stationary ribs or bars 23. The drive of the return pulley 22 is synchronized with that of the sprocket wheels 16 in such a way that the moulds 10 and the conveyor belt are advanced at the same speed.

Provided on either side of the conveyor belt 21 is a pair of supporting bars 24 which extend in the direction of movement of the moulds along said conveyor belt 21. Said supporting bars have their upper sides inclined to that of the conveyor belt so that these sides successively rise in the direction of movement of the moulds and are arranged at the same angle to the upper side of the conveyor belt as that in which the surface portions 12 on one longitudinal side surface of the moulds—in the lower run of the circuitous path, the bottom surface—are arranged in relation to the remainder of said side surface. The upper surfaces of the supporting bars 24 are arranged at a mutual horizontal distance transversely of the path of movement of the moulds, which is equal to the distance between the surface portions 12 longitudinally of the moulds so that the moulds with their surface portions 12 oriented in such a way that, like the upper surfaces of the supporting bars 24 they rise in the direction of movement of the moulds, slide onto the supporting bars 24 when moving in said direction, with the surface portions 12 in bearing engagement with the upper surfaces of said bars. During their movement along the supporting bars 24 the moulds will be raised from the conveyor belt due to the inclination imparted to the upper surfaces of the supporting bars. Thanks to the fact that the surface portions 12 have the same inclination as the upper surfaces of the supporting bars 24, this raising movement will be effected as a parallel movement, i.e. those side surfaces of the moulds which like the end surfaces thereof are substantially vertical during the movement of the moulds on the plate 14 and the conveyor belt 21, do not change their direction in space by said raising movement. In order that the moulded cubes may come loose from the moulds and slide out of them during this raising movement, the supporting bars 24 are connected to a vibrator 25 by means of which they are vibrated vertically. The vibrations are transferred to the moulds which consequently slide off the moulded cubes 11′ formed in said moulds, said moulded cubes remaining on the conveyor belt 21 without changing their regular shape in any way.

The conveyor belt 21 now moves the moulded cubes 11′ to a drying apparatus 110 preferably of the type operating with high-frequency heat, in which the cubes are rapidly dried with resulting abrupt increase of their solidity by reason of the packed sugar crystals being cemented together to a solid body by crystals which are precipitated during the drying operation.

The moulds 10 shall now be returned to the left-hand end, as seen in FIG. 1, of the lower run in order to be utilized again for moulding further cubes. At the right-hand end, as seen in FIG. 1, of the endless circuitous path there is shown a means that can be used to move the moulds 10 to the upper run of the circuitous path. Said means comprises a cylindrical drum 26 which is mounted for rotation and against the outer surface of which the moulds 10 arriving from the supporting means 24 are pressed by a pair of endless belts 27 each of which passes over three return pulleys 28 and extends with one run along half the circumference of the drum 26. Said drum 26 is not driven and the belts 27 need not either be driven, but the transport can nevertheless be facilitated by either of the return pulleys 28 being driven in synchronism with the sprocket wheels 16 at such a speed that the belts 27 tend to drive the moulds 10 somewhat more rapidly than what corresponds to the speed provided by the sprocket wheels 16, with the result that a certain slip occurs between the endless belts 27 and their respective driven return pulleys 28 or between the belts 27 and the moulds 10.

In the upper run each of the moulds rests at their ends on supporting bars 30 with that longitudinal side surface which in the lower run constituted the upper side of the mould. The moulds travel through cleaning means 31 in which they are washed with hot water for removal of sugar crystals that may have adhered thereto, and are then blown dry. They then arrive at the left-hand arcuate run of the circuitous path, as seen in FIG. 1, in which they are guided in a channel formed by the base plate 14 and the supporting bars 30 and then again reach the sprocket wheels 16 to be passed once again through the circuitous path.

By controlling the vibration intensity of the vibrating guide bars 15' the filling capacity can be regulated in respect of the nature of the raw material so that a certain weight can be retained in each sugar cube irrespectively of whether the raw material should present variations in respect of grain size, grain size distribution, moisture etc. By varying the vibration intensity of the vibrating guide bars 15" the compactness of the lump sugar, i.e. its porosity and easy solubility, can be regulated.

The described machine has proved extremely well suited to carry out the method according to the invention, but it should be kept in mind that it is a test machine and that it will therefore be possible to provide many advantageous and useful modifications in order to adapt the machine to a more broadly arranged manufacture. The invention therefore is not limited to the embodiment of the machine herein described, but can be modified within the scope of the appendant claims.

It should be mentioned that in carrying out the method of the invention also horizontal vibration has been used when the moulds 10 are raised from the conveyor belt, but this was found to be less suitable because the moulded cubes are slightly deformed and become narrower at the upper end than at their lower one. This embodiment is, however, of a certain interest, as it is possible in such a case to arrange a single vibrator not only for the guide bars 15' and 15" but also for all vibrating parts of the machine.

It should be pointed out that the method of the invention can be applied also to moulded cubes that have been prepared in a manner other than by vibration, but like those prepared by vibration are very brittle in moist condition.

When the moulded cubes obtained in the apparatus described with reference to FIGS. 1–7 are discharged from the apparatus, regularly arranged in transverse rows and with clearances between the rows and between the moulded cubes in each row, it is possible when packaging the moulded cubes to benefit by this regularity by making use of ranged packaging, i.e. a method in which the moulded cubes are arranged in superimposed uniform layers, the more so as the moulded cubes, when so packed, better withstand external pressures on the carton than when they are packed in disorder as is now generally done when packing lump sugar made according to adopted measures, a fact to which special attention must be paid if the moulded cubes in the method of the present invention are moulded by vibration of the crystal composition in the moulds, because this method as a rule yields a lump sugar which is more porous and more readily soluble but on the other hand also more brittle than that made according to the methods as heretofore applied.

The coordination of the operation of the moulding apparatus with that of the packaging means, which is necessary in order that the making and packaging of the lump sugar may proceed continuously from the supply of the crystal composition to the moulding apparatus up to the discharge of the packed lump sugar from the packaging means, is associated, however, with a number of problems, such as that of maintaining a predetermined size and weight of the sugar cubes in order that a package containing a predetermined number of complete sugar cube layers may keep a predetermined weight and the sugar may fill out the package well, and that of synchronizing the moulding apparatus and the packaging means in the correct phase to obtain a uniform and continuous operation and the least possible waste in the packaging operation. The present invention therefore also relates to measures which contribute to solving these problems and which will now be described more in detail with reference to FIGS. 8 to 13 in the drawings.

Reference is first made to FIG. 8 in which the sprocket wheel 16 moving the moulds 10 in the circuitous path is connected by means of a transmission 101 to a drive 102 which is adapted, through a transmission 103, to drive also the drive roller 22 of the conveyor belt 21. The transmissions 101 and 103 preferably are sprocket or gear wheel transmissions. Beneath the filling hopper 17 there is symbolically shown the vibrator 18 which is operatively connected to the guide bars 15' for vibrating the moulds in the circuitous path 10 during the filling of said moulds with crystal composition from the filling hopper 17, the vibration taking place transversely of the plane of the drawing as seen in FIG. 8. Also the vibrator 20 is symbolically shown, and it is operatively connected to the guide bars 15" for vibrating the moulds in the circuitous path 10, after they have been filled with crystal composition beneath the filling hopper 17, likewise transversely of the plane of the drawing as seen in FIG. 8. The moulding apparatus in FIG. 8, which has so far been described broadly, corresponds to that described more in detail with reference to FIGS. 1 to 7. As alternative means for regulating the filling capacity of the moulds 10, also a shutter 104 is shown here. Said shutter is movable by means of a symbolically shown motor 105 to a position in which said shutter more or less covers the discharge opening of the filling hopper 17.

Before the construction and function of the regulating systems shown in FIG. 8 are described more in detail, the plant supplying the filling hopper 17 with a moist composition of sugar crystals shall be outlined briefly, as this plant will be mentioned in connection with a system adapted, according to the invention, to regulate the moisture content of the crystal composition. The plant includes a boiling pan 106 in which sugar solution (refined juice) is boiled, the boiling being regulated in such a way during successive skippings that these alternatively give preponderantly big and small sugar crystals, whereafter crystal compositions from different skippings are mixed in a crystallizer 107 to give a crystal composition of mixed large and small crystals, which is the prerequisite for obtaining in the moulding apparatus moulded cubes of a predetermined high density. If the crystal composition consisted of crystals of substantially one and the same size, the moulded cubes would become too porous, as the interstices of the crystals would not be filled out. If, on the other hand, large and small crystals occur in mixture, the smaller crystals are able to fill out the interstices between the larger ones. The crystal composition thus obtained is supplied to a centrifuge 108, whose drive motor is designated 109. In this centrifuge the crystal composition is separated from the syrup and is then washed. The moisture content of the crystal composition leaving the centrifuge will be dependent on how far the centrifuging operation is driven after the washing operation, and there is thus the possibility of influencing, by regulating the centrifuging time, the moisture content of the crystal composition supplied to the filling hopper 17.

The moulded cubes prepared in the moulding apparatus are conveyed on the conveyor belt 21 through a drying apparatus 110 such as a conventional electrically heated oven, in which the molded cubes, which are moist as they come from the moulding operation, are dried and thus hardened. Before the moulded cubes are supplied to preferably continuously operating packaging means which is assumed to be disposed at the right-hand end of the conveyor belt 21 as seen in FIG. 8, but which is not shown in detail therein, the moulded cubes must be measured as to their size and weight. As for the size it is only a single dimension that need be measured, viz. the dimension transversely of the plane of the drawing (FIG. 8), that is the dimension in the sense in which the moulds are vibrated during and after the filling by means of the vibrators 18, 20, while the remaining dimensions practically do not undergo any variations in such a vibration method as is concerned in a moulding apparatus of the type shown in FIGS. 1 to 7 and 8. The variations of the dimension transversely of the plane of the drawing cannot be disregarded, as they may lead to the result that a layer composed of several moulded cubes will become so large that it is not accommodated in a carton of the given dimensions, or will become so small that the individual cubes of the layer have too great a freedom of motion in the carton, from which rattling and wearing of the individual cubes result; it is therefore necessary continuously to measure this dimension and to keep it under control. The weight of the moulded cubes must also be kept at a constant value, as each package shall generally be of quite a determined weight and as every package, when ranged packaging is applied, should in addition contain only full layers, i.e. all layers shall consist of one and the same number of moulded cubes. Since the dimension of the moulded cubes extending in the vibrating direction is dependent on one hand on the filling capacity and on the other on the vibration effected after the filling to pack the crystals together, whereas the weight is dependent merely on the filling capacity, it is possible to correct the weight of the moulded cubes during the filling operation and then, without disturbing the correction thus obtained, to correct also the dimension of the moulded cubes.

The systems provided in FIG. 8 for said measures of correction include measuring means 111 which can be a conventional device in which a fixed jaw and a movable jam embrace one or more cubes, said movable jaw being associated with a sliding contact in a potentiometer, so that an electrical signal is delivered from said potentiometer in accordance with the position of the movable jaw and hence in accordance with the dimension of the cube or cubes embraced by said jaws, which is disposed adjacent to the right-hand end of the conveyor belt 21 as seen in FIG. 8 and which measures the dimension of one or more moulded cubes transversely of the plane of the drawing and delivers a signal representing the measure obtained to a preferably indicating converter 112 of the values measured, which in turn delivers a suitable signal to a preferably integrating regulator 113 which regulates the vibration intensity exerted by the vibrator 20 on the moulds 10 via the drive bars 15'. A practical embodiment of means for varying the vibration intensity will be described later on. Weighing means 114, which can be a conventional conveyor weigher, disposed after the measuring means 111 in the direction of movement of the conveyor belt 21 weighs the moulded cubes individually or by rows and delivers the measured value obtained to a preferably indicating converter 115 of the values measured, which in turn forwards the signal in a convenient form to a regulator 116 preferably integrating in respect of said signal. This regulator can cause a variation of the filling capacity in different ways, and in FIG. 8 two alternative arrangements are shown for obtaining such a regulation. In one alternative the regulator 116 adjusts the vibration intensity that the vibrator 18 exerts on the moulds 10 via the guide bars 15'—a similar regulating action is effected by the regulator 113 in respect of the vibrator 20—and in the other alternative the regulator 116 varies the position of the shutter 104 above the motor 105.

As the filling capacity is dependent also upon the moisture content of the crystal composition supplied, a system is provided according to the invention which has the task on one hand temporarily to compensate for a variation of the moisture content by influencing the means regulating the filling capacity, and on the other hand to cause a remaining correction of the moisture content of the crystal composition supplied. This eliminates the delay of the correction of the weight of the moulded cubes, that would be obtained, at a variation of the moisture content of the crystal composition, when a regulation is carried out only with the aid of the weighing means 114. The system includes sensing means 117 in the filling hopper 17 which delivers a signal representative of the moisture content of the crystal composition to a preferably indicating converter 118 of the values measured, which signal is forwarded in a suitable form to the regulator 116. While the regulator 116 in respect of the signal from the converter 115 provides an integrated regulation, it provides in respect of the signal from the converter 118 a preferably proportioning regulation, as the sensing of the controlling quantity in this case takes place ahead of the point where the action of the regulator 116 sets in. The variation of the filling capacity in dependence on the moisture content of the crystal composition, that is realized by the regulator 116, is however merely a compensation and must be considered as a temporary measure which should be replaced by a permanent correction of the moisture content of the crystal composition supplied. This correction is attained in that the converter 118 delivers a signal to a preferably integrating regulator 119 which produces a remaining change of the time during which the motor 109 is driven for a final drying of the crystal composition in the centrifuge 108, in such a direction that a predetermined moisture content is obtained.

Since the converters and regulators used in the regulating systems shown are well known within the field, they have been represented in the drawings only in block form.

The mechanism, shown in FIG. 9, for varying the intensity of the vibration exerted on the moulds 10 either during or after filling of the moulds, will now be described in detail. A vibrator 122 having a rotating eccentric member is mounted on a base 120 by means of supporting springs 121, and it produces a vibration in a horizontal sense in the direction of the double arrow 123 when the eccentric member is rotated. These vibrations are transferred to a support 124 disposed in the moulding apparatus and rigidly connected to the vibrator 122, said support 124 carrying a guide bar 125 rigidly secured to said support (and corresponding to either of the two guide bars 15' or to both guide bars 15"), and a guide bar 126 (corresponding to the other of the two guide bars 15' and 15", respectively). Said guide bar 126 is movably guided on pins 127 in the support 124 so as to be movable towards and away from the guide bar 125 for varying the dimension L shown in FIG. 9. Between the guide bars 125 and 126 the moulded cubes are advanced on the stationary base plate 14, each mould having clearances in relation to the guide bars 125 and 126 because its largest dimension, designated 1 in the drawing, is smaller than the dimension L. The vibration intensity exerted on the moulded cubes can now be changed by variation of the clearances between the moulds 10 and the guide bars 125 and 126. For this purpose the guide bar 126 is biased with each of its pins 127 against an eccentric disk 129 by a spring 128. The eccentric disks for all pins 127 are non-rotatably secured to a shaft 130 which is mounted for rotation in the support 124 and which through a transmission 131 is operatively connected to a servomotor 132 driven from the regulator 113 and 116, respectively.

FIG. 10 shows a simple form of a moisture content sensing means 117 which is here shown as consisting of two spaced-apart electrode systems 136, 137 which are arranged on a plate 135 of insulating material. These electrode systems may serve to measure the electrical conductivity or dielectrical properties of the crystal composition and may be connected to a resistance or capacitance measuring bridge 138 of any known type, from which unbalance signals are transmitted to the converter 118.

For a better understanding of the synchronizing means suggested according to the invention, reference is now made to FIGS. 11–13. FIG. 11 shows the moulding apparatus according to the invention diagrammatically and with the same reference numerals as in FIG. 8, for which reason its need not be described more in detail here. According to FIG. 11, there is arranged from the drive motor 102 a drive shaft 140 for a packaging machine which is represented in FIG. 11 by a diagrammatically shown means 141 for collecting several rows of moulded cubes to a layer fitting a carton in that a predetermined number of moulded cubes is brought together in the direction of movement of the conveyor 21. A conventional construction can include a rake like member mounted for vertical and horizontal movement, and means for lowering said member into the space between two adjacent transverse rows of cubes and for moving it in the longitudinal direction of the conveyor in order to move two or more transverse rows of cubes together. The remaining means of the packaging machine, for instance means for collecting the moulded cubes transversely of the direction of movement of the conveyor 21 and means for placing the layer obtained in said carton, are of no interest here as their operation can easily be coordinated with that of the means 141. Therefore, they will not be discussed here in detail. In order that the operating cycle of the collecting means 141 may be displaced in time without influencing the operation of the moulding apparatus, although it is driven from the same drive motor 102 as said moulding apparatus, a planetary gearing is provided in the transmission between the collecting means 141 and the drive motor 102. Said planetary gearing is symbolically indicated at 142 and the transmission ratio thereof can be varied in a known manner by means of a regulator 143. The output shaft of the gearing is designated 140'. Displacement of the operating cycle of the collecting means 141 without changing the operation of the moulding apparatus is necesary if the phase of the collecting means relatively to the moulded cubes on the conveyor 21 has been disturbed, for instance as a result of the endless belt 21 slipping on the drive roller 22 or its expansion in length in the drying apparatus 110. If the moulding apparatus and the packaging machine are driven each by a motor of its own, a phase displacement may also arise as a result of the motors not running down equally when they stop, for which reason a phase-correct synchronization between the collecting means 141 and the rows of moulded cubes has to be effected at every new start. A phase displacement caused in this or that manner could otherwise lead to the collecting means 141 not engaging between two adjoining rows of moulded cubes but hitting such a row instead, which must naturally be prevented.

For sensing the phase of the collecting means 141 relatively to the moulded cubes arriving on the conveyor 21 at said means 141, a synchronism detector 144 is placed directly ahead of said means. Said detector is driven by the output shaft 140' and delivers its signals to a converter 145 of the values measured, which in turn gives a suitable signal to the regulator 143 for increasing or reducing the r.p.m. of the output shaft 140' of the planetary gearing 142 in relation to the input shaft thereof, whatever is required, to restore phase coincidence.

FIGS. 12 and 13 show an embodiment of the synchronism detector. It consists of a circular disk 150 driven by the output shaft 140' of the planetary gearing 142, said disk having along its periphery rectangular projections 151 arranged at a regular pitch thereon. The disk 150 is driven at such a speed and has such a pitch that at prevailing phase coincidence between the disk 150 and the rows of moulded cubes on the conveyor 21 and consequently between the collecting means 141 and the rows of moulded cubes, the projections 151 are in turn presented opposite the clearance between two adjoining rows of moulded cubes when they pass the position exactly beneath the axis of rotation of the disk 150, as is shown in FIG. 12. The projections 151 are so dimensioned as to fully cover this clearance. Provided between the disk 150 and the moulded cubes travelling past said disk is a shield 152 with two rectangular openings 153 and 154 which are situated each on one side of the point positioned directly beneath the axis of rotation of the disk 150 and at such a distance from said point that those projections 151, which are on either side of the projection disposed directly beneath the axis of rotation of the disk 150, together with the rows of moulded cubes on either side of said projection cover the openings 153 and 154 except for two triangular areas 153' and 154'. At a phase displacement between the disk 150 and the rows of moulded cubes on the conveyor belt 21 in one or the other direction either of the openings 153 and 154 is covered more than the other one—in the instance shown in FIG. 13 the opening 153 is entirely covered while there is a large exposed area 154" in the opening 154. The difference, thus existing at a phase displacement, in size of the uncovered areas of the openings can be sensed by a suitable medium, e.g. as shown in FIG. 14 by a pair of light rays which are directed pulsewise from two electrical bulbs 155 and 156 through lenses 157 and 158, respectively, towards photocells 159 and 160, respectively, opposite the openings 153 and 154, respectively, on the side of the disk 150 opposite said bulbs, every time a projection 151 passes the point directly beneath the axis of the disk 150. Obviously the supply of pulsed electrical current to the bulbs may be controlled by the rotation of the disk 150, e.g. by a chopper switch connected to the driving shaft thereof. A measuring bridge 161 e.g. a Wheatstone bridge connected to the two photocells delivers in such a case the signal transmitted to the converter 145 and corresponding as to amplitude and sign to the size and direction of the phase displacement. Other means may of course also be used for sensing the size of the uncovered areas.

The regulator 143 may be adapted to lead the moulded cubes conveyed on the conveyor 21 past the packaging machine as long as the phase displacement remains in existence.

What we claim and desire to secure by Letters Patent is:
1. An apparatus for making moulded cubes of sugar from a moist composition of sugar crystals, comprising a plurality of successively arranged moulds each having mould recesses with a removal opening therein for permitting removal of a cube moulded therein, means for guiding the moulds in a closed path, conveying means for moving the moulds in said path, means for filling a moist composition of sugar crystals into the moulds, said moulds being positioned in at least a part of said path with their removal openings facing downwardly, supporting means beneath said moulds in said part of said path and closing said removal openings in said part of said path, at least one vibrating supporting bar extending in the direction of movement of said moulds along said cube supporting means and having an upper surface, said surface being inclined with respect to the cube supporting surface of said cube supporting means and extending upwardly in the direction of movement of the moulds, each mould having at one end thereof and facing said cube supporting surface, a surface which has the same inclination as said upper surface of said vibrating supporting bar and is adapted to bear against said upper surface for vibrating the mould, and means for conveying the moulded cube away from beneath the vibrating support bar, whereby when the mould is vibrated, the cube moulded therein is caused to be removed and placed on the conveying means and conveyed away from beneath the moulds.

2. An apparatus as claimed in claim 1 in which said moulds are rods which are arranged one after the other and extend transversely of the direction of movement, the mould recesses in said rods being in a regular pattern.

3. An apparatus as claimed in claim 2 in which each rod has therein at least one of the mould recesses, each of said recesses being a hole which extends through the rod between opposite surfaces of the rod, the mouth of said hole at one of said surfaces of the rod being said removal opening while the mouth of said hole in the other one of said surfaces of the rod being a filling opening of the mould.

4. An apparatus as claimed in claim 3 in which said mould moving means includes at least one driven toothed wheel and means on said rods for engaging said toothed wheel.

5. An apparatus as claimed in claim 4 in which said means on said rods are pins which project from the rods on either side of the row formed by said plurality of successively arranged rods.

6. An apparatus as claimed in claim 5 in which said closed path has upper and lower substantially rectilinear runs and arcuate runs connecting said substantially rectilinear runs.

7. An apparatus as claimed in claim 6 in which said mould guiding means comprises a rotatably mounted cylindrical drum, at least one endless member, and means supporting said endless member with a run thereof extending along substantially half the circumference of said drum and holding the moulds against said drum along one of said arcuate runs of said endless path.

8. An apparatus as claimed in claim 7 further comprising a cleaning apparatus for the moulds, said cleaning apparatus being positioned in said closed path.

9. An apparatus as claimed in claim 1 in which said cube conveying means comprises an endless belt and a drive for driving said endless belt, said mould conveying means and said endless belt drive means being synchronized to advance the mould and the endless belt in the same direction and at the same speed.

10. An apparatus as claimed in claim 9 and further comprising collecting means, said endless belt being adapted to transfer the moulded cubes to said collecting means from said apparatus, said apparatus further comprising an element rotatably driven in synchronism with said collecting means and having a series of portions equidistantly spaced from each other, which portions are, during the rotation of the element, fed in continuous sequence along a portion of the endless belt and which at a level with the rows of the moulded cubes leaving said apparatus on said endless belt have the same spacing as said rows, means for sensing the phase difference between said portions of the element and the moulded cubes on the endless belt in respect of distance and direction of the cubes from said portions, and a regulator controlled by the sensing means for varying the operating speed of the collecting means for bringing into phase of the element and the moulded cube on said endless belt.

11. An apparatus as claimed in claim 1 further comprising means for vibrating the moulds during and after filling the same with the moist composition of sugar crystals, said means including opposed guide bars, which extend along said path of the moulds on either side of the row formed by the successively arranged moulds, said guide bars being rigidly connected to each other, and at least one vibrator operatively connected to one of said guide bars to vibrate same horizontally transversely of said path a distance sufficient to cause the moulds to be thrown back and forth between said guide bars.

12. An apparatus as claimed in claim 11 in which said moulds are shorter transversely of their direction of movement than the distance between said guide bars so that there is a clearance therebetween.

13. An apparatus as claimed in claim 12 further comprising means for moving at least one of said guide bars for varying the size of said clearance.

14. An apparatus as claimed in claim 13 further comprising means for mounting said guide bars for rigidly connecting them, said mounting means being connected to the vibrator, one of said guide bars being movably mounted on said mounting means for movement towards and away from the opposed guide bar, at least one rotatable eccentric disk on said mounting means, and at least one biasing spring biasing said movable guide bar against said eccentric disk.

15. An apparatus for making moulded cubes of sugar from a moist composition of sugar crystals, including at least one mould having a removal opening therein for permitting removal of a cube moulded therein, conveying means for moving said mould while maintaining the mould with said removal opening facing downwardly, supporting means beneath said conveying means and having a surface for supporting the moulded cube when the mould is maintained with said opening facing downwardly, at least one vibrating supporting bar extending in the direction of movement of said moulds along said cube supporting means and having an upper surface, said surface being inclined with respect to the cube supporting surface of said cube supporting means and extending upwardly in the direction of movement of the moulds, each mould having at one end thereof and facing said cube supporting surface, a surface which has the same inclination as said upper surface of said vibrating supporting bar and is adapted to bear against said upper surface for vibrating the mould, and means for conveying the moulded cube away from beneath the vibrating support bar, whereby when the mould is vibrated, the cube moulded therein is caused to be removed and placed on the conveying means and conveyed away from beneath the mould.

16. An apparatus for making moulded cubes of sugar from a moist composition of sugar crystals, including at least one mould having a removal opening therein for permitting removal of a cube moulded therein, conveying means for moving said mould while maintaining the mould with said opening facing downwardly, supporting means beneath said conveying means having a surface for supporting the moulded cube when the mould is maintained with said opening facing downwardly, means for vibrating the mould containing the moist composition of sugar crystals after the composition has been filled into the mould, at least one vibrating supporting bar extending in the direction of movement of said moulds along said cube supporting means and having an upper surface, said surface being inclined with respect to the cube supporting surface of said cube supporting means and extending upwardly in the direction of movement of the moulds, each mould having at one end thereof and facing said cube supporting surface, a surface which has the same inclination as said upper surface of said vibrating supporting bar and is adapted to bear against said upper surface for vibrating the mould and causing the moulded cube to be discharged from the mould, means for receiving and conveying the moulded cube away from beneath the vibrating support bar, means for drying the moulded cubes, means for measuring the dimension of the dry moulded cubes in the direction in which they have vibrated, and a regulator controlled by said measuring means for varying the vibration intensity exerted on the moist composition of sugar crystals in the mould.

17. An apparatus for making moulded cubes of sugar from a moist composition of sugar crystals, including at least one mould having a removal opening therein for permitting removal of a cube moulded therein, conveying means for moving said mould while maintaining the mould with said opening facing downwardly, supporting means beneath said conveying means having a surface for supporting the moulded cube when the mould is maintained with said opening facing downwardly, a hopper means having a variable outlet opening for filling said mould with a moist composition of sugar crystals, a filling capacity regulator for varying the outlet opening of said hopper means, means for vibrating the mould containing the moist composition of sugar crystals after the composition has been filled into the mould, at least one vibrating supporting bar extending in the direction of movement of said moulds along said cube supporting means and having an upper surface, said surface being inclined with respect to the cube supporting surface of said cube supporting means and extending upwardly in the direction of movement of the moulds, each mould having at one end thereof and facing said cube supporting surface, a surface which has the same inclination as said upper surface of said vibrating supporting bar and is adapted to bear against said upper surface for vibrating the mould and causing the moulded cube to be discharged from the mould, means for receiving and conveying the moulded cube away from beneath the vibrating support bar, means for drying the moulded cubes, means for measuring the dimension of the dry moulded cubes in the direction in which they have vibrated, and a regulator controlled by said measuring means for varying the vibration intensity exerted on the moist composition of sugar crystals in the mould, and means for weighing moulded cubes after the drying, the said filling capacity regulator being controlled by said weighing means.

18. An apparatus as claimed in claim 17 further comprising means for measuring the moisture content of the moist composition of sugar crystals supplied to said filling means, said moisture content measuring means being operatively connected to said filling capacity regulator and together with said weighing means controlling said filling capacity regulator for varying the filling capacity of said filling means.

19. An apparatus as claimed in claim 18 comprising a further regulator controlled by said moisture content measuring means, means for varying the moisture content of the moist composition of sugar crystals supplied to said filling means, said moisture varying means being controlled by said further regulator.

20. An apparatus as claimed in claim 19 in which said regulator for varying the filling capacity of said filling means comprises integrating means for comparing the values measured by said weighing means with the desired value and producing an output causing said regulator to reduce the difference between said value, said regulator being controlled directly by the values measured by the moisture content measuring means.

21. An apparatus as claimed in claim 20 in which said moisture content measuring means is adapted to measure electrical properties of the moist composition of sugar crystals.

22. An apparatus as claimed in claim 21 in which said moisture content measuring means includes spaced measuring electrodes in contact with the moist composition of sugar crystals supplied to the mould, and a measuring bridge connected to said measuring electrodes.

References Cited in the file of this patent

UNITED STATES PATENTS

| | | |
|---|---|---|
| 1,304,186 | Jordan | May 20, 1919 |
| 1,905,975 | Thomas | Apr. 25, 1933 |
| 2,719,346 | Caciagli | Oct. 4, 1955 |